United States Patent
Ikeo et al.

(10) Patent No.: US 11,148,501 B2
(45) Date of Patent: Oct. 19, 2021

(54) AIR FLOW DEVICE FOR VEHICLE

(71) Applicant: SUBARU CORPORATION, Tokyo (JP)

(72) Inventors: Masahiko Ikeo, Tokyo (JP); Motonari Masatani, Tokyo (JP); Takako Mizuno, Tokyo (JP); Hiroaki Mikami, Tokyo (JP); Hirotake Nishina, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/798,508

(22) Filed: Feb. 24, 2020

(65) Prior Publication Data

US 2020/0189347 A1 Jun. 18, 2020

Related U.S. Application Data

(62) Division of application No. 15/280,310, filed on Sep. 29, 2016, now abandoned.

(30) Foreign Application Priority Data

Sep. 30, 2015 (JP) .................... 2015-193056

(51) Int. Cl.
 *B60H 1/00* (2006.01)
(52) U.S. Cl.
 CPC ..... *B60H 1/00021* (2013.01); *B60H 1/00071* (2013.01); *B60H 1/00271* (2013.01);
 (Continued)
(58) Field of Classification Search
 CPC ....... F05D 2270/172; F15B 2201/4053; F15D 1/0075; F15D 1/12
 (Continued)

(56) References Cited

U.S. PATENT DOCUMENTS

| 3,524,044 A | 8/1970 | Liardi |
| 3,541,390 A * | 11/1970 | Jahnke ................ B60H 3/0071 |
| | | 361/231 |

(Continued)

FOREIGN PATENT DOCUMENTS

| DE | 102012021561 A1 | 5/2013 |
| JP | 1-27943 Y | 8/1989 |

(Continued)

OTHER PUBLICATIONS

Final Office Action for U.S. Appl. No. 15/280,310, dated Nov. 25, 2019, 16 pages.

(Continued)

*Primary Examiner* — Edelmira Bosques
*Assistant Examiner* — Frances F. Hamilton
(74) *Attorney, Agent, or Firm* — Chip Law Group

(57) ABSTRACT

An air flow device for a vehicle including an instrument panel dashboard, and a blower, the air flow device comprising a first outlet on a front upper surface portion of the instrument panel dashboard from which an air is sent along the front upper surface to a first inlet on the instrument panel dashboard into which the air blown from the first outlet is drawn; and a second outlet on a back upper surface portion of instrument panel dashboard from which an air is sent along the back upper surface to a second inlet on the instrument panel. The blower outlets are installed so as to open parallel to the blower inlets along an upper surface portion of the instrument panel dashboard.

6 Claims, 7 Drawing Sheets

(52) U.S. Cl.
CPC ... *B60H 1/00295* (2019.05); *B60H 2001/003* (2013.01); *B60H 2001/00085* (2013.01); *B60H 2001/00099* (2013.01); *B60H 2001/00214* (2013.01); *B60H 2001/00607* (2013.01)

(58) Field of Classification Search
USPC .......................................................... 454/140
See application file for complete search history.

(56) References Cited

U.S. PATENT DOCUMENTS

| | | | |
|---|---|---|---|
| 4,788,904 A * | 12/1988 | Radtke | B60H 1/32 |
| | | | 454/164 |
| 5,447,469 A * | 9/1995 | Dausch | B60H 1/00057 |
| | | | 165/42 |
| 6,119,987 A * | 9/2000 | Kiknadze | F15D 1/12 |
| | | | 244/204 |
| 6,186,887 B1 | 2/2001 | Dauvergne | |
| 6,439,468 B1 * | 8/2002 | Lambert | B64D 13/00 |
| | | | 236/49.3 |
| 6,796,894 B1 | 9/2004 | Matsuno et al. | |
| 7,137,438 B2 * | 11/2006 | Nomura | A47F 3/0443 |
| | | | 165/64 |
| 7,147,271 B2 | 12/2006 | Aase et al. | |
| 7,380,756 B1 | 6/2008 | Enloe et al. | |
| 7,624,941 B1 | 12/2009 | Patel et al. | |
| 7,891,409 B2 | 2/2011 | Araki et al. | |
| 7,984,614 B2 * | 7/2011 | Nolcheff | F04D 29/687 |
| | | | 60/751 |
| 8,047,598 B2 | 11/2011 | Takeda | |
| 8,091,950 B2 | 1/2012 | Corke et al. | |
| 9,788,666 B2 * | 10/2017 | Wood | A47F 3/0447 |
| 9,821,862 B2 | 11/2017 | Han et al. | |
| 2004/0195462 A1 | 10/2004 | Malmuth et al. | |
| 2004/0200932 A1 | 10/2004 | Scott et al. | |
| 2006/0065389 A1 | 3/2006 | Huang et al. | |
| 2006/0172677 A1 | 8/2006 | Ryu | |
| 2007/0257513 A1 | 11/2007 | Schwartz | |
| 2008/0067283 A1 | 3/2008 | Thomas | |
| 2008/0277004 A1 | 11/2008 | Hagseth et al. | |
| 2009/0052137 A1 | 2/2009 | Ouyang | |
| 2009/0081939 A1 * | 3/2009 | Tsuneyoshi | B60H 1/00849 |
| | | | 454/156 |
| 2009/0294596 A1 | 12/2009 | Sinha et al. | |
| 2010/0026034 A1 | 2/2010 | Storgato et al. | |
| 2010/0102174 A1 | 4/2010 | Roy | |
| 2010/0172747 A1 * | 7/2010 | Clark | F01D 5/143 |
| | | | 415/177 |
| 2010/0310381 A1 | 12/2010 | Roy | |
| 2010/0329838 A1 | 12/2010 | Greenblatt | |
| 2011/0048025 A1 | 3/2011 | Ginn et al. | |
| 2011/0268556 A1 * | 11/2011 | Montgomery | F01D 5/186 |
| | | | 415/116 |
| 2012/0291874 A1 | 11/2012 | Tanaka et al. | |
| 2012/0301296 A1 | 11/2012 | Greenblatt et al. | |
| 2013/0001368 A1 | 1/2013 | Silkey et al. | |
| 2015/0285515 A1 | 10/2015 | Lee et al. | |
| 2016/0230783 A1 | 8/2016 | Onishi et al. | |
| 2017/0087962 A1 * | 3/2017 | Tamura | H05H 1/24 |
| 2019/0077215 A1 * | 3/2019 | Baek | B60H 1/245 |

FOREIGN PATENT DOCUMENTS

| | | | |
|---|---|---|---|
| JP | 06-106970 A | | 4/1994 |
| JP | 06106970 A | * | 4/1994 ............... B60H 1/34 |
| JP | 11254945 A | | 9/1999 |
| JP | 2011-168214 A | | 9/2011 |
| JP | 2014-180985 A | | 9/2014 |
| WO | 2015/017782 A1 | | 2/2015 |

OTHER PUBLICATIONS

Non-Final Office Action for U.S. Appl. No. 15/280,310, dated Jan. 18, 2019, 16 pages.
Final Office Action for U.S. Appl. No. 15/280,310, dated Apr. 3, 2018, 15 pages.
Non-Final Office Action for U.S. Appl. No. 15/280,310, dated Nov. 24, 2017, 09 pages.
Office Action Received for Chinese Patent Application No. 201610853232.0, dated Sep. 29, 2017, 07 Pages of Office Action.
Office Action received for Japanese Patent application No. 2015-193056, dated Sep. 6, 2016, 4 pages of office action and 02 pages of English translation.

* cited by examiner

AIR FLOW DEVICE FOR VEHICLE

CROSS-REFERENCE TO RELATED APPLICATIONS

This application is a divisional application of Ser. No. 15/280,310, filed Sep. 29, 2016, which claims priority benefit from Japanese Priority Patent Application No. JP 2015-193056 filed in the Japan Patent Office on Sep. 30, 2015. Each of the above-referenced applications is hereby incorporated herein by reference in its entirety.

BACKGROUND

Technical Field

The present invention relates to an air flow device for an instrument panel, and in particular, an air flow device for an instrument panel which blows air from the instrument panel and makes the air flow in a vehicle compartment.

Related Art

An instrument panel disposed at the front of the vehicle compartment of an automobile is typically positioned right under the windshield and has large heat capacity. Accordingly, the instrument panel is heated to a high temperature, for example, by the strong sunshine through the windshield in summer, and remains hot for a long time. The hot instrument panel makes it difficult to lower the temperature in the vehicle compartment even while the air conditioner is in operation, and thus a passenger sitting near the instrument panel is unfortunately exposed to the heat for a long time. Accordingly, it is desirable to provide an air flow device for an instrument panel which makes air flow around the instrument panel to prevent heat from propagating from the instrument panel to a passenger.

As a technique of making air flow to prevent heat from propagating from an instrument panel to a passenger, for example, Japanese Examined Utility Model (Registration) Application Publication No. 01-027943 describes an instrument panel cooling device that has, on the upper surface of the instrument panel, a cooling blower outlet which blows conditioned air backward from the front end of the upper surface of the instrument panel, and has a conditioned air blower inlet at a position separated backward from the blower outlet along the upper surface of the instrument panel. This instrument panel cooling device can prevent heat from propagating from the instrument panel to a passenger by forcing the conditioned air to circulate as cooling air, and efficiently lowering the temperature of the instrument panel.

However, the instrument panel cooling device described in Japanese Examined Utility Model (Registration) Application Publication No. 01-027943 does not have the cooling blower outlet and the conditioned air blower inlet disposed to face each other on the instrument panel, and it is thus difficult to make air flow smoothly between the cooling blower outlet and the conditioned air blower inlet. Accordingly, a part of air blown from the cooling blower outlet flows toward a passenger, and the heat of the instrument panel may propagate to the passenger.

SUMMARY OF THE INVENTION

It is desirable to provide an air flow device for an instrument panel which surely prevents heat from propagating between the instrument panel and a passenger.

An aspect of the present invention provides an air flow device for an instrument panel which blows an air from the instrument panel at a front of a vehicle compartment of an automobile to make the air flow to the vehicle compartment, the air flow device including: a blower; a blower outlet on the instrument panel, from which an air sent from the blower to which the blower outlet is coupled is blown to the vehicle compartment; and a blower inlet on the instrument panel for the blower outlet, into which the air blown from the blower outlet is drawn. The blower outlet is installed so as to open to the blower inlet along a surface of the instrument panel while the blower inlet is installed so as to open to the blower outlet along the surface of the instrument panel.

The blower outlet may be disposed closer to a back of the vehicle than the blower inlet, and installed in a manner that an air is blown toward the front of the vehicle.

The instrument panel may have an upper surface that gradually inclines downward to the back of the vehicle. The blower outlet may have an upper surface blower outlet installed on the upper surface of the instrument panel while the blower inlet may have an upper surface blower inlet installed on the upper surface of the instrument panel, and one of the upper surface blower outlet and the upper surface blower inlet may be disposed near a front edge of the upper surface while another of the upper surface blower outlet and the upper surface blower inlet may be disposed near a point that is closest to the back of the vehicle on the upper surface where the upper surface inclines downward.

The upper surface blower outlet may be coupled to a cooling heat exchanger that cools an air, and the air cooled by the cooling heat exchanger may be blown from the upper surface blower outlet.

The instrument panel may have a lower surface that gradually inclines upward to the back of the vehicle. The blower outlet may have a lower surface blower outlet installed on the lower surface of the instrument panel while the blower inlet may have a lower surface blower inlet installed on the lower surface of the instrument panel, and one of the lower surface blower outlet and the lower surface blower inlet may be disposed near a front edge of the lower surface while another of the lower surface blower outlet and the lower surface blower inlet may be disposed near a point that is closest to the back of the vehicle on the lower surface where the lower surface inclines upward.

The lower surface blower outlet may be coupled to a heating heat exchanger that heats an air, and the air heated by the heating heat exchanger may be blown from the lower surface blower outlet.

The air flow device for an instrument panel may further include: a guide between the blower outlet and the blower inlet on the instrument panel, which guides the air blown from the blower outlet to the blower inlet.

The blower inlet may be disposed on an extension that lies along the surface of the instrument panel from the blower outlet.

DETAILED DESCRIPTION

Figure 1:
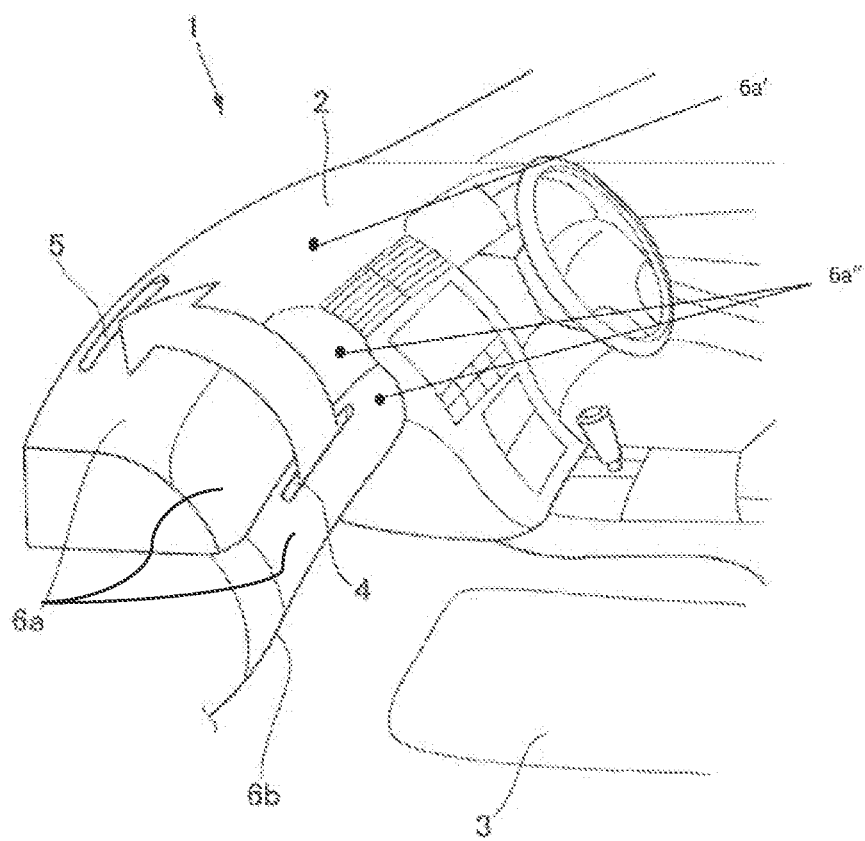
FIG. 1 illustrates a configuration of an automobile including an air flow device for an instrument panel according to Implementation 1 of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

The following describes implementations of the present invention on the basis of the appended drawings.

Implementation 1

FIG. 1 illustrates the configuration of an automobile including an air flow device for an instrument panel according to Implementation 1 of the present invention. This automobile includes a windshield 1 that covers the front of the vehicle compartment, an instrument panel 2 that is disposed right under the windshield 1, a seat 3 that is disposed closer to the back of the vehicle than the instrument panel 2, a blower outlet 4 that is installed on the instrument panel 2, and a blower inlet 5 that is installed on the instrument panel 2 for the blower outlet 4.

The instrument panel 2 has an upper surface 6a that is installed so as to extend in the vehicle width direction, and to project from the front of the vehicle compartment toward the seat 3, and faces upward in opposition to the windshield 1, and a lower surface 6b that faces downward in opposition to the floor.

The upper surface 6a gradually inclines downward to the back of the vehicle, and the front part 6a' of the upper surface 6a almost faces upward in the perpendicular direction while the back part 6a" of the upper surface 6a is disposed to diagonally face the back of the vehicle (i.e. upper part of the seat 3). In other words, the windshield 1 hangs over the upper surface 6a, and the upper surface 6a is disposed to face the upper half of the body of a passenger sitting on the seat 3.

The lower surface 6b is installed on the side of both ends of the instrument panel 2 (which namely corresponds to the seat 3), and a passenger sitting on the seat 3 inserts his or her feet in the space defined between the lower surface 6b and the floor. The lower surface 6b gradually inclines upward to the back of the vehicle, and the front part of the lower surface 6b almost faces downward in the perpendicular direction while the back part of the upper surface 6a is disposed to diagonally face the back of the vehicle (i.e. lower part of the seat 3).

Air is blown to the vehicle compartment from the blower outlet 4, and the blower outlet 4 is installed near the back edge of the upper surface 6a of the instrument panel 2.

The air blown from the blower outlet 4 is drawn into the blower inlet 5, and the blower inlet 5 is installed near the front edge of the upper surface 6a of the instrument panel 2.

Figure 2:
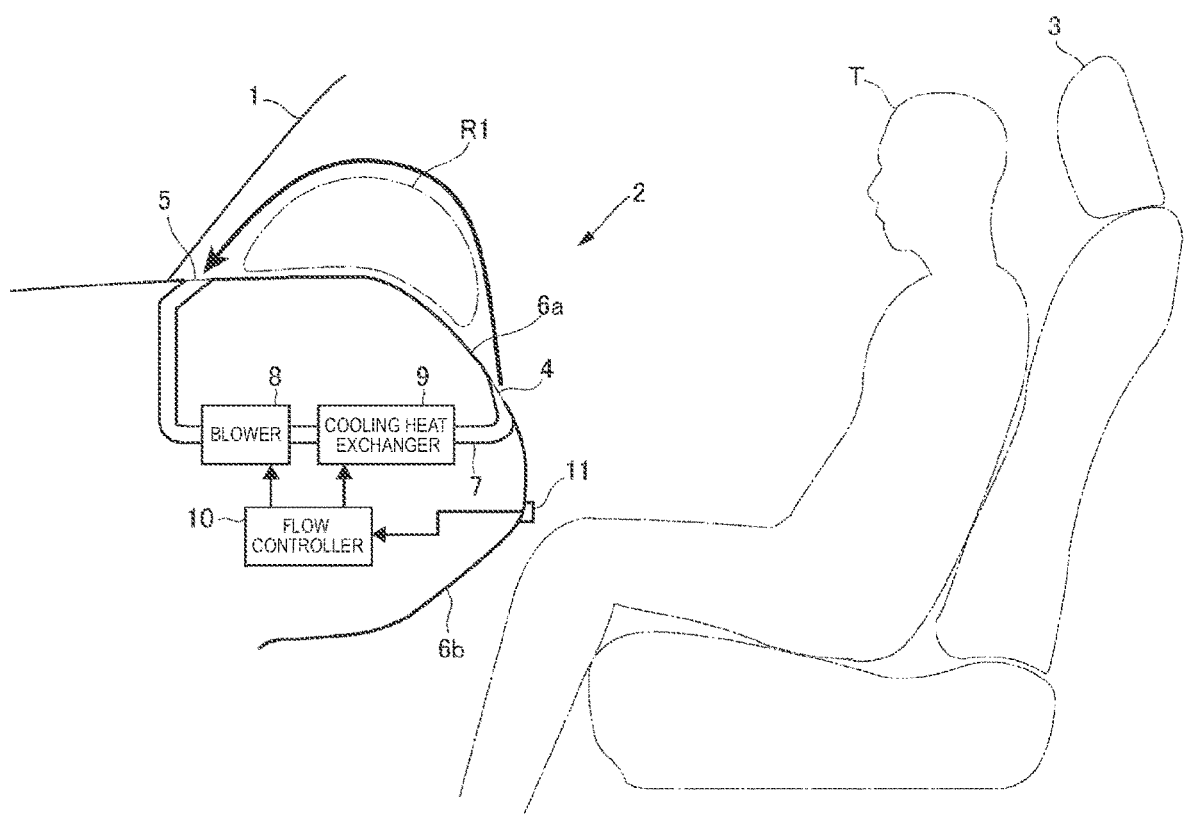
FIG. 2 illustrates a configuration of an air flow device for an instrument panel.

In other words, as illustrated in FIG. 2, the blower outlet 4 is disposed closer to the back of the vehicle than the blower inlet 5, and is installed so as to open to the blower inlet 5 along the upper surface 6a of the instrument panel 2. This allows air to be blown from the blower outlet 4 toward the blower inlet 5, which is closer to the front of the vehicle.

Meanwhile, the blower inlet 5 is installed so as to open to the blower outlet 4 along the upper surface 6a of the instrument panel 2. This blower inlet 5 is disposed on an extension that lies along the surface of the instrument panel 2 from the blower outlet 4. Furthermore, the blower outlet 4 and the blower inlet 5 are parallel to each other and have the same length in the vehicle width direction. This disposes the blower outlet 4 and the blower inlet 5 along the upper surface 6a of the instrument panel 2 in opposition to each other, and the air blown from the blower outlet 4 is sequentially drawn into the blower inlet 5.

The blower outlet 4 serves as an upper surface blower outlet in one implementation of the present invention, while the blower inlet 5 serves as an upper surface blower inlet in one implementation of the present invention.

The blower outlet 4 and the blower inlet 5 are coupled to a blower 8 and a cooling heat exchanger 9 via a flow path 7. The blower 8 and the cooling heat exchanger 9 are coupled to a flow controller 10, and this flow controller 10 is coupled to an operation receiver 11 installed on the instrument panel 2.

The flow path 7 couples the blower outlet 4 to the blower inlet 5, and guides air from the blower inlet 5 to the blower outlet 4.

The blower 8 sends air toward the blower outlet 4 and draws air from the blower inlet 5 to draw the air blown from the blower outlet 4 from the blower inlet 5 and to make the air in the flow path 7 flow from the blower inlet 5 toward the blower outlet 4.

The cooling heat exchanger 9 is disposed downstream of the blower 8 in the air flow direction, and cools the air that flows through the flow path 7.

The blower 8 sends and draws air to blow the air from the blower outlet 4 toward the blower inlet 5, and the blown air flows over the instrument panel 2 between the blower outlet 4 and the blower inlet 5. Accordingly, hot air R1 heated by the instrument panel 2 is enclosed between the instrument panel 2 and the air blown from the blower outlet 4 toward the blower inlet 5.

The operation receiver 11 is used to allow a passenger T to operate the flow of air flowing over the instrument panel 2, and disposed on the surface of the instrument panel 2.

The flow controller 10 controls, for example, the quantity of air to be sent by the blower 8 and the temperature of air to be adjusted by the cooling heat exchanger 9 in accordance with an operation on the operation receiver 11.

Next, an operation according to Implementation 1 will be described.

First of all, sunshine enters the vehicle compartment of the automobile via the windshield 1, the sunshine is incident on the instrument panel 2 disposed right under the windshield 1, and the instrument panel 2 is heated to a high temperature. The hot instrument panel 2 heats the air around the instrument panel 2 into the hot air R1, and this hot air R1 sequentially moves toward the passenger T who sits near the instrument panel 2. This exposes the passenger T to the heat having a high temperature for a long time even if the temperature of the vehicle compartment has been lowered by the air conditioner.

The passenger T then operates the flow controller 10 through the operation receiver 11 as illustrated FIGS. 1 and 2 to drive the blower 8 and the cooling heat exchanger 9. The blower 8 sends air toward the blower outlet 4 through the flow path 7, and the air is cooled via the cooling heat exchanger 9 and then blown to the vehicle compartment from the blower outlet 4. The air blown from the blower outlet 4 is sequentially drawn from the blower inlet 5. This causes air to flow over the upper surface 6a of the instrument panel 2 from the blower outlet 4 to the blower inlet 5, allowing the hot air R1 to be enclosed between the air flowing from the blower outlet 4 to the blower inlet 5 and the instrument panel 2. Accordingly, it is possible to prevent the hot air R1 from moving toward the passenger T.

The blower outlet 4 is installed so as to open to the blower inlet 5 along the upper surface 6a of the instrument panel 2 (i.e. the blower outlet 4 is installed so as to open in the direction inclined toward the front of the vehicle with respect to the perpendicularly upward direction), while the blower inlet 5 is installed so as to open to the blower inlet 5 along the upper surface 6a of the instrument panel 2 (i.e. the blower inlet 5 is installed so as to open in the direction inclined toward the back of the vehicle with respect to the perpendicularly upward direction). Accordingly, it is possible to make air flow smoothly from the blower outlet 4 to the blower inlet 5, and to surely prevent the hot air R1 from moving toward the passenger T.

The blower outlet 4 is disposed closer to the back of the vehicle than the blower inlet 5 and blows air toward the front of the vehicle. Accordingly, it is possible to keep the hot air R1 at the front of the vehicle compartment, and to more surely prevent the hot air R1 from moving toward the passenger T1. The air blown from the blower outlet 4 is cooled by the cooling heat exchanger 9, and it is thus possible to more surely prevent the heat of the hot air R1 from propagating to the passenger T.

Meanwhile, the blower inlet 5 is disposed on an extension that lies along the surface of the instrument panel 2 from the blower outlet 4, and it is thus possible to make air flow smoothly from the blower outlet 4 to the blower inlet 5. Furthermore, the blower outlet 4 and the blower inlet 5 are parallel to each other and have the same length in the vehicle width direction. Accordingly, it is possible to make air flow smoothly from the blower outlet 4 to the blower inlet 5.

Additionally, it is preferable to dispose the blower outlet 4 and the blower inlet 5 in a manner that air flows over the upper surface 6a of the instrument panel 2 in the front-back direction. In other words, it is preferable to dispose the blower inlet 5 near the front edge of the upper surface 6a of the instrument panel 2, and to dispose the blower outlet 4 near the point that is the closest to the back of the vehicle on the upper surface 6a of the instrument panel 2 where the upper surface 6a of the instrument panel 2 inclines downward. This makes air flow over the entire upper surface 6a of the instrument panel 2 in the front-back direction, and it is thus possible to surely prevent the heat of the hot air R1 from propagating to the passenger T.

In this way, the air drawn from the blower inlet 5 is drawn by the blower 8 to flow toward the blower outlet 4 through the flow path 7. The air is cooled via the cooling heat exchanger 9, and then blown to the vehicle compartment again from the blower outlet 4.

According to the present implementation, the blower outlet 4 is installed so as to open to the blower inlet 5 along the upper surface 6a of the instrument panel 2, while the blower inlet 5 is installed so as to open to the blower outlet 4 along the upper surface 6a of the instrument panel 2. Accordingly, it is possible to make air flow smoothly between the blower outlet 4 and the blower inlet 5, and to surely prevent heat from propagating between the instrument panel 2 and the passenger T.

Implementation 2

Although the blower outlet 4 and the blower inlet 5 are installed on the upper surface 6a of the instrument panel 2 in Implementation 1, the installation positions are not limited thereto as long as the blower outlet 4 is installed so as to open to the blower inlet 5 along the surface of the instrument panel 2 while the blower inlet 5 is installed so as to open to the blower outlet 4 along the surface of the instrument panel 2.

Figure 3:
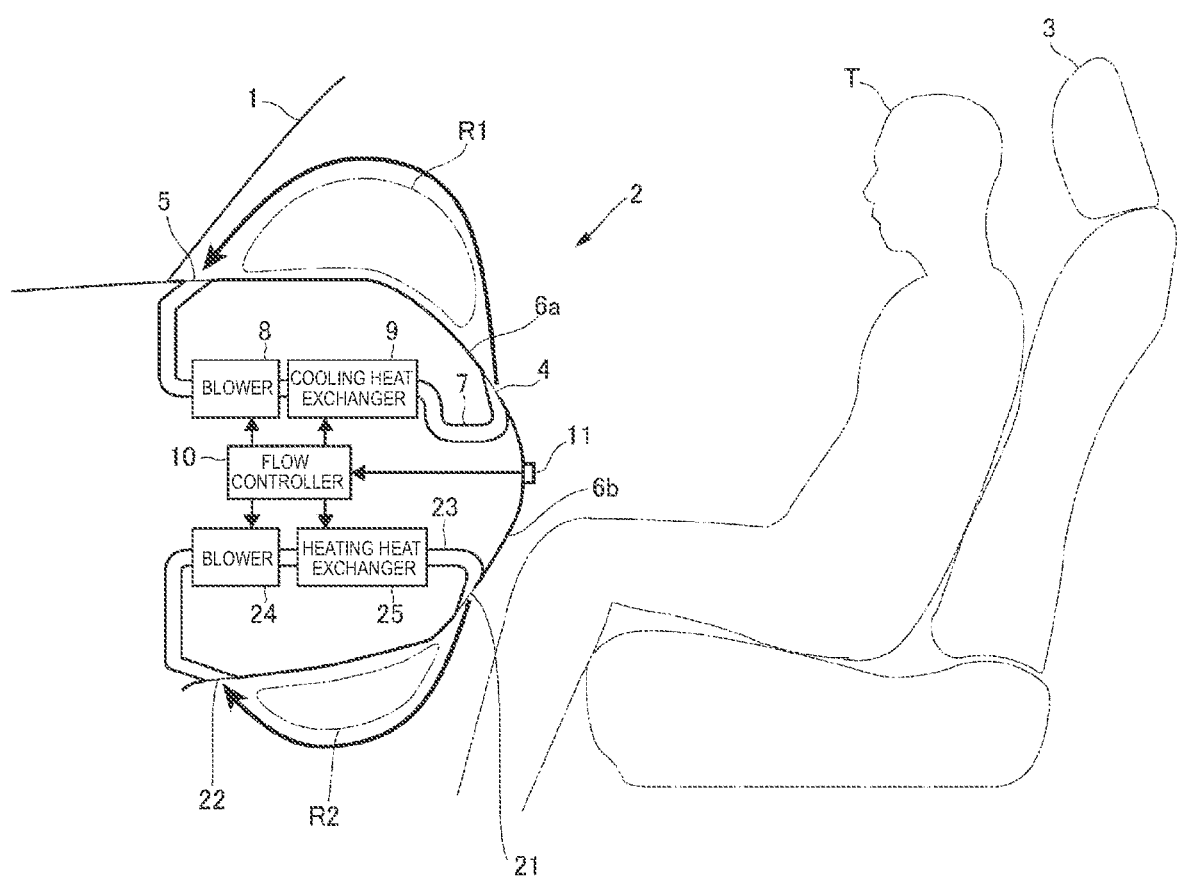
FIG. 3 illustrates a configuration of an air flow device for an instrument panel according to Implementation 2.

For example, as illustrated in FIG. 3, it is possible in Implementation 2 to newly dispose a blower outlet 21, a blower inlet 22, a flow path 23, a blower 24, and a heating heat exchanger 25.

The blower outlet 21 is installed near the back edge of the lower surface 6b of the instrument panel 2, while the blower inlet 22 is installed near the front edge of the lower surface 6b of the instrument panel 2. In other words, the blower outlet 21 is disposed closer to the back of the vehicle than the blower inlet 22, and is installed so as to open to the blower inlet 22 along the lower surface 6b of the instrument panel 2. This allows air to be blown from the blower outlet 21 toward the blower inlet 22, which is closer to the front of the vehicle.

The blower inlet 22 is installed so as to open to the blower outlet 21 along the lower surface 6b of the instrument panel 2. This causes the air blown from the blower outlet 21 to be sequentially drawn into the blower inlet 22.

The blower outlet 21 serves as a lower surface blower outlet in one implementation of the present invention, while the blower inlet 22 serves as a lower surface blower inlet in one implementation of the present invention.

The blower outlet 21 and the blower inlet 22 are coupled to the blower 24 and the heating heat exchanger 25 via the flow path 23, and the blower 24 and the heating heat exchanger 25 are coupled to the flow controller 10.

The flow path 23 couples the blower outlet 21 to the blower inlet 22, and guides air from the blower inlet 22 to the blower outlet 21.

The blower 24 sends air toward the blower outlet 21 and draws air from the blower inlet 22 to draw the air blown from the blower outlet 21 from the blower inlet 22 and to make the air in the flow path 23 flow from the blower inlet 22 toward the blower outlet 21.

The heating heat exchanger 25 is disposed downstream of the blower 24 in the air flow direction, and heats the air that flows through the flow path 23.

The blower 24 sends and draws air to blow the air from the blower outlet 21 toward the blower inlet 22, and the blown air flows over the instrument panel 2 between the blower outlet 21 and the blower inlet 22.

The lower surface 6b of the instrument panel 2 receives no sunshine through the windshield 1, and thus remains cool for a long time in contrast to the upper surface 6a. The cool lower surface 6b of the instrument panel 2 cools the air around the lower surface 6b into cool air R2, and this cool air R2 deprives the passenger T of heat from his or her legs.

The passenger T then operates the flow controller 10 through the operation receiver 11 to drive the blower 24 and the heating heat exchanger 25. The blower 24 sends air toward the blower outlet 21 through the flow path 23, and the air is cooled via the heating heat exchanger 25 and then blown to the vehicle compartment from the blower outlet 21. The air blown from the blower outlet 21 is sequentially drawn from the blower inlet 22. This causes air to flow over the lower surface 6b of the instrument panel 2 from the blower outlet 21 to the blower inlet 22, allowing the cool air R2 to be enclosed between the air flowing from the blower outlet 21 to the blower inlet 22 and the instrument panel 2. Accordingly, it is possible to prevent the cool air R2 from depriving the passenger T of the heat.

The blower outlet 21 is installed so as to open to the blower inlet 22 along the lower surface 6b of the instrument panel 2 (i.e. the blower outlet 21 is installed so as to open in the direction inclined toward the front of the vehicle with respect to the perpendicularly downward direction), while the blower inlet 22 is installed so as to open to the blower inlet 21 along the lower surface 6b of the instrument panel 2 (i.e. the blower inlet 22 is installed so as to open in the direction inclined toward the back of the vehicle with respect to the perpendicularly downward direction). Accordingly, it is possible to make air flow smoothly from the blower outlet 21 to the blower inlet 22, and to surely prevent the cool air R2 from depriving the passenger T from the heat.

The blower outlet 21 is disposed closer to the back of the vehicle than the blower inlet 22 and blows air toward the front of the vehicle. Accordingly, it is possible to keep the cool air R2 at the front of the vehicle compartment, and to more surely prevent the cool air R2 from depriving the passenger T1 of the heat. The air blown from the blower outlet 21 is heated by the heating heat exchanger 25, and it is thus possible to more surely prevent the heat of the cool air R2 from depriving the passenger T of the heat.

Additionally, it is preferable to dispose the blower outlet 21 and the blower inlet 22 in a manner that air flows over the lower surface 6b of the instrument panel 2 in the front-back direction. In other words, it is preferable to dispose the blower inlet 22 near the front edge of the lower surface 6b of the instrument panel 2, and to dispose the blower outlet 21 near the point that is the closest to the back of the vehicle on the upper surface 6b of the instrument panel 2 where the upper surface 6b of the instrument panel 2 inclines upward. This makes air flow over the entire lower surface 6b of the instrument panel 2 in the front-back direction, and it is thus possible to surely prevent the heat of the cool air R2 from depriving the passenger T from the heat.

According to the present implementation, it is possible to enclose the cool air R2, which has been cooled by the lower surface 6b of the instrument panel 2, and to surely prevent heat from propagating between the instrument panel 2 and the passenger T by covering the lower surface 6b of the instrument panel 2 with the air flowing from the blower outlet 21 to the blower inlet 22. In this way, it is possible to install the blower outlet 21 and the blower inlet 22 in accordance with the temperature distribution of the surface of the instrument panel 2, and to prevent the temperature of the instrument panel 2 from affecting the passenger T.

Implementation 3

It is preferable in Implementations 1 and 2 to further install a guide that guides the air blown from the blower outlet to the blower inlet.

Figure 4:
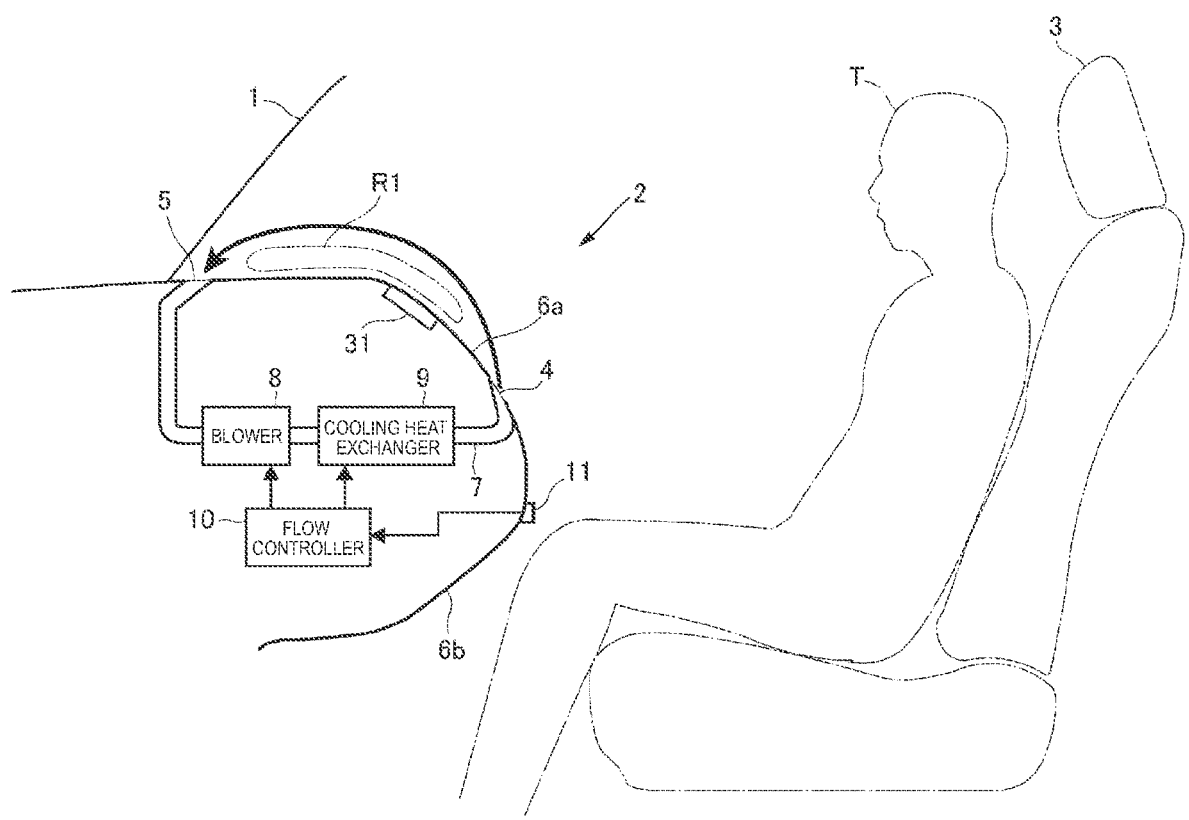
FIG. 4 illustrates a configuration of an air flow device for an instrument panel according to Implementation 3.

For example, as illustrated in FIG. 4, it is possible in Implementation 3 to dispose a guide 31 between the blower outlet 4 and the blower inlet 5 on the upper surface 6a of the instrument panel 2. This guide 31 includes a so-called plasma actuator that uses a pair of electrodes to generate plasma which induces the flow toward the front of the vehicle along the upper surface 6a of the instrument panel 2.

In this way, the guide 31 can make air flow more smoothly from the blower outlet 4 to the blower inlet 5 by guiding the air blown from the blower outlet 4 to the blower inlet 5. The guide 31 guides air along the upper surface 6a of the instrument panel 2, and can thus enclose the hot air R1 in small space and cool the upper surface 6a of the instrument panel 2 by using the air cooled by the cooling heat exchanger 9.

It is desirable to cover the surface of the guide 31, for example, with a porous material in order to avoid electrical influence.

According to the present implementation, the guide 31 guides the air blown from the blower outlet 4 to the blower inlet 5, and it is thus possible to surely make air flow from the blower outlet 4 to the blower inlet 5.

Implementation 4

Although the upper surface 6a or the lower surface 6b of the instrument panel 2 has a blower outlet and a blower inlet in Implementations 1 to 3, it is also possible to install a plurality of blower outlets and a plurality of blower inlets for the respective blower outlets.

Figure 5:
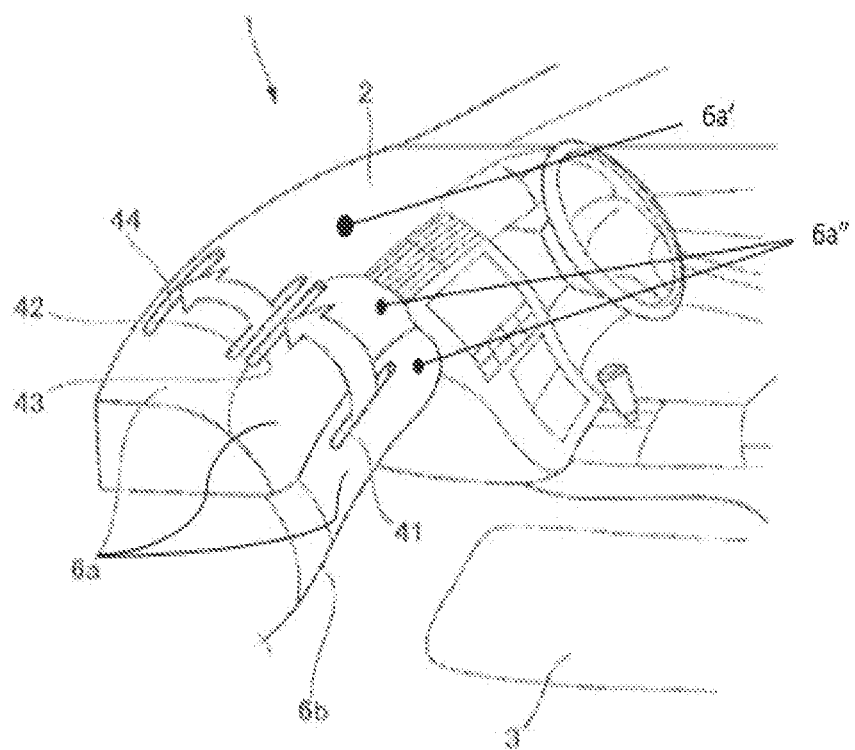
FIG. 5 illustrates a configuration of an air flow device for an instrument panel according to Implementation 4.

For example, as illustrated in FIG. 5, it is possible to dispose blower outlets 41 and 42, and blower inlets 43 and 44 instead of the blower outlet 4 and the blower inlet 5 in Implementation 1.

The blower outlet 41 is disposed for the blower inlet 43, while the blower outlet 42 is disposed for the blower inlet 44. In other words, the blower outlet 41 is installed so as to open to the blower inlet 43 along the upper surface 6a of the instrument panel 2, while the blower inlet 43 is installed so as to open to the blower outlet 41 along the upper surface 6a of the instrument panel 2. Similarly, the blower outlet 42 is installed so as to open to the blower inlet 44 along the upper surface 6a of the instrument panel 2, while the blower inlet 44 is installed so as to open to the blower outlet 42 along the upper surface 6a of the instrument panel 2. Additionally, the blower outlet 41, the blower outlet 42, the blower inlet 43, and the blower inlet 44 are coupled to the blower 8 and the cooling heat exchanger 9 via the flow path 7.

This makes air flow over the upper surface 6a of the instrument panel 2 from the blower outlet 41 to the blower inlet 43, while making air flow over the upper surface 6a of the instrument panel 2 from the blower outlet 42 to the blower inlet 44.

According to the present implementation, air flows from the blower outlet 41 to the blower inlet 43 so as to divide the upper surface 6a of the instrument panel 2 in the front-back direction of the vehicle, while air flows from the blower outlet 42 to the blower inlet 44. It is thus possible to surely make air flow from the blower outlet 41 toward the blower inlet 43, and from the blower outlet 42 toward the blower inlet 44.

Disposing a plurality of blower outlets and a plurality of blower inlets for the respective blower outlets makes it possible to dispose the blower outlets substantially in opposition to the respective blower inlets on the curved surface of the instrument panel 2, and to surely make air flow from the blower outlets toward the blower inlets.

Although a blower outlet is disposed closer to the back of the vehicle than a blower inlet in Implementations 1 to 4 as described above, the positions of the blower outlet and the blower inlets are not limited thereto as long as the blower outlet is installed so as to open to the blower inlet along the surface of the instrument panel 2 while the blower inlet is installed so as to open to the blower outlet along the surface of the instrument panel 2.

Figure 6:
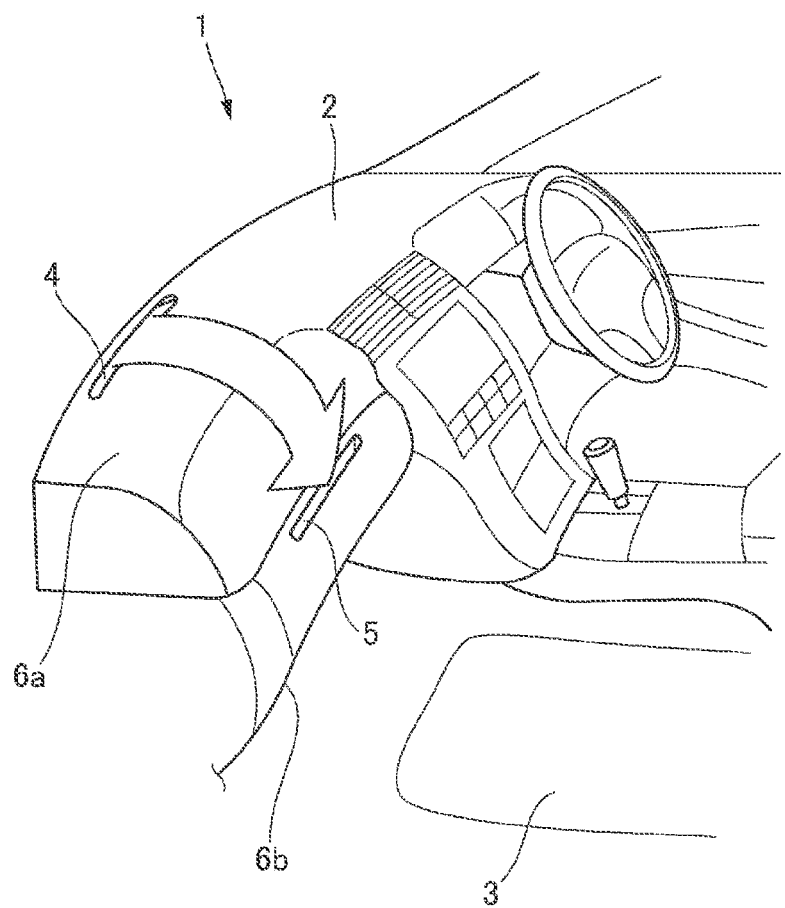
FIG. 6 illustrates a configuration of an air flow device for an instrument panel according to a modification of Implementations 1 to 4.

For example, as illustrated in FIG. 6, the blower outlet 4 can be disposed closer to the front of the vehicle than the blower inlet 5, and the blower outlet 4 can blow air toward the back of the vehicle in a modification of Implementations 1 to 4.

Figure 7:
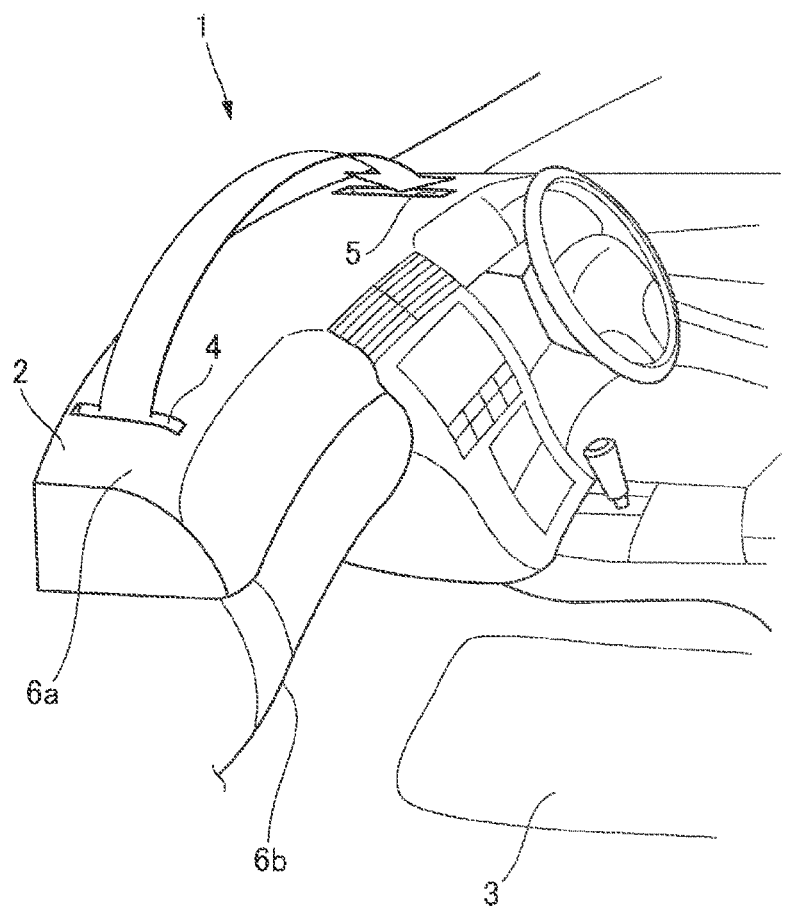
FIG. 7 illustrates a configuration of an air flow device for an instrument panel according to another modification of Implementations 1 to 4.

For example, as illustrated in FIG. 7, the blower outlet 4 can also be disposed spaced apart from the blower inlet 5 in the vehicle width direction, and the blower outlet 4 can blow air in the vehicle width direction in another modification of Implementations 1 to 4.

Although the passenger T operates the operation receiver 11 to drive the air flow device in Implementations 1 to 4 as described above, it is also possible to dispose a thermometer on the surface of the instrument panel 2, and to make the flow controller 10 automatically control the driving of the air flow device on the basis of the temperature indicated by the thermometer.

For example, in Implementation 1, a thermometer is disposed on the upper surface 6a of the instrument panel 2, and when the temperature indicated by the thermometer becomes higher than a predetermined value, the flow controller 10 drives the blower 8 and the cooling heat exchanger 9. This makes it possible to enclose the hot air R1 with a high degree of accuracy by using the air flowing from the blower outlet 4 to the blower inlet 5.

A blower outlet can change the blowing direction of air by using a fin or the like in Implementations 1 to 4 as described above. For example, a blower outlet can change the blowing direction of air to the direction toward the passenger T.

A blower outlet can also be installed so as to open to a blower inlet by a fin along the surface of the instrument panel 2 in Implementations 1 to 4 as described above, while the blower inlet can be installed so as to open to the blower outlet by a fin along the surface of the instrument pane 2. In other words, the opening of the blower outlet does not have to face the blower inlet, while the opening of the blower inlet does not have to face the blower outlet.

Although a blower outlet is coupled to a blower inlet via a flow path to make air circulate in Implementations 1 to 4 as described above, the blower outlet does not have to be coupled to the blower inlet to make air circulate as long as air can flow over the surface of the instrument panel between the blower outlet and the blower inlet. For example, the blower outlet and the blower inlet can be each coupled to a flow path and a blower.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. An air flow device for a vehicle,
the vehicle including:
   a vehicle compartment;
   a windshield at a front of the vehicle compartment;
   an instrument panel dashboard disposed below the windshield; and
   a seat disposed closer to a back end of the vehicle than the instrument panel dashboard,
   wherein the instrument panel dashboard includes:
      an upper surface that faces upward in opposition to the windshield; and
      a lower surface that faces downward in opposition to a floor of the vehicle, and
   wherein the upper surface includes:
      (i) a front part adjacent to an edge of the windshield, wherein the front part of the upper surface faces upward in opposition to the windshield in a perpendicular direction; and
      (ii) a back part closer to the back end of the vehicle than the front part, wherein the back part of the upper surface diagonally faces an upper part of the seat of the vehicle, and wherein the back part is inclined more than the front part and is adjacent to the front part, and
the air flow device comprising:
   a first inlet disposed on the front part of the upper surface adjacently to the edge of the windshield, the first inlet extending along the edge of the windshield;
   a first outlet disposed on the front part of the upper surface, the first outlet extending along a direction parallel to the first inlet;
   a second inlet disposed on the back part of the upper surface, the second inlet extending along the direction parallel to the first inlet;
   a second outlet disposed on the back part of the upper surface apart from the second inlet, the second outlet extending along the direction parallel to the first inlet; and
   a blower coupled to the first inlet, the first outlet, the second inlet, and the second outlet via a flow path, wherein the blower makes a first air flow along the upper surface from the first outlet to the first inlet, and makes a second air flow along the upper surface from the second outlet to the second inlet, and
   wherein a flow direction of the first air flow and a flow direction of the second air flow are identical.

2. The air flow device according to according to claim 1, wherein the air flow device further comprises a guide including a plasma actuator on the upper surface of the instrument panel dashboard.

3. The air flow device according to claim 1, wherein, in the extending direction of the first inlet, the first outlet, the second inlet, and the second outlet have lengths substantially identical to a length of the first inlet.

4. The air flow device according to claim 1, wherein the upper surface of the instrument panel dashboard gradually inclines downward to a back of the vehicle.

5. The air flow device according to claim 1, wherein the first inlet, the first outlet, the second inlet, and the second outlet are further coupled to a cooling heat exchanger that cools air via the flow path.

6. The air flow device according to according to claim 5, wherein the lower surface of the instrument panel dashboard gradually inclines upward to a back of the vehicle,
   wherein the air flow device further comprises:
      a lower surface outlet disposed on the lower surface of the instrument panel dashboard; and
      a lower surface inlet disposed on the lower surface of the instrument panel dashboard apart from the lower surface outlet, and wherein the lower surface outlet is coupled to a heating heat exchanger that heats air, and a third air flow heated by the heating heat exchanger is flown from the lower surface outlet into the lower surface inlet.

* * * * *